United States Patent
Park (10) Patent No.: US 8,265,293 B2
(45) Date of Patent: Sep. 11, 2012

(54) AUDIO SIGNAL OUTPUT METHOD AND APPARATUS FOR SHORT-RANGE COMMUNICATION ENABLED HEADSET

(75) Inventor: Jong Myung Park, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1261 days.

(21) Appl. No.: 12/011,919

(22) Filed: Jan. 30, 2008

(65) Prior Publication Data
US 2008/0212820 A1 Sep. 4, 2008

(30) Foreign Application Priority Data
Mar. 2, 2007 (KR) .................. 10-2007-0020732

(51) Int. Cl.
*H04B 3/00* (2006.01)
(52) U.S. Cl. .......................................... 381/77; 381/57
(58) Field of Classification Search .................... 381/74, 381/311, 330, 57, 77–81, 86, 302, 309, 85, 381/1, 2, 3, 6, 14, 56
See application file for complete search history.

(56) References Cited

U.S. PATENT DOCUMENTS
2006/0018460 A1* 1/2006 McCree ................... 379/406.08
2006/0172780 A1* 8/2006 Krippgans ................. 455/569.2
2007/0238475 A1* 10/2007 Goedken ....................... 455/512

* cited by examiner

*Primary Examiner* — Ha Tran T Nguyen
*Assistant Examiner* — Kevin Quinto
(74) *Attorney, Agent, or Firm* — Cha & Reiter, LLC (57) ABSTRACT

An audio signal output method and apparatus for a short-range communication enabled headset are disclosed. An audio signal of the headset can be output through an internal speaker or be transmitted to an in-vehicle speaker unit. The audio signal output method includes checking, when an audio signal is present, an operating mode of the headset, outputting, if the headset is in a normal headset mode, the audio signal through an internal speaker and transmitting, if the headset is in a frequency modulation (FM) transmission mode, the audio signal through an FM channel to an in-vehicle speaker unit for reproduction, wherein the input and output gains are adjusted based on a determined vibration levels.

36 Claims, 4 Drawing Sheets

FIG. 5

AUDIO SIGNAL OUTPUT METHOD AND APPARATUS FOR SHORT-RANGE COMMUNICATION ENABLED HEADSET

CLAIM OF PRIORITY

This application claims the benefit of the earlier filing date, pursuant to 35 USC 119, to that patent application entitled "AUDIO SIGNAL OUTPUT METHOD AND APPARATUS FOR BLUETOOTH ENABLED HEADSET" filed in the Korean Intellectual Property Office on Mar. 2, 2007 and assigned Serial No. 2007-0020732, the contents of which are incorporated herein by reference.

BACKGROUND OF THE INVENTION

1. Field of the Invention

The present invention relates to a short range wireless technology and, more particularly, to an apparatus and method for a short-range communication, e.g., Bluetooth, -enabled headset that controls signal output paths for received audio signals through switching between a normal headset mode and FM transmission mode.

2. Description of the Related Art

A Bluetooth network is normally referred to as a 'piconet', wherein a master Bluetooth device is connected to a plurality of slave Bluetooth devices through Bluetooth communication protocol. In the Bluetooth piconetwork each slave device can receive data from the master device. A plurality of piconets can be connected to one another to form a 'scatternet'.

Users of Bluetooth enabled mobile terminals exchange data among themselves using Bluetooth communication protocol. In particular, a Bluetooth enabled headset can be wirelessly connected to a Bluetooth-enabled mobile terminal, to enable interactive voice conversation and enabling listening to songs in the MPEG-1 Audio Layer 3 (MP3) format.

A voice call using a mobile terminal and Bluetooth-enabled headset proceeds as follows. The Bluetooth-enabled headset receives a voice signal from the user through its own microphone, and sends the received voice signal to the mobile terminal through Bluetooth communication. The mobile terminal then transmits the voice signal from the Bluetooth enabled headset to another mobile terminal via a wireless communication network, for example.

The headset also receives an audio signal from the mobile terminal, and outputs the received audio signal through its own speaker. The audio signal includes a voice signal originated from another mobile terminal, or an acoustic signal of an audio file played by the mobile terminal.

However, the speaker of a headset is small and has a low output power level. Hence, audio sounds from the headset may be not heard by nearby persons. That is, nearby persons cannot enjoy music together using the same headset.

To solve this problem, a separate special purpose speaker, which is connectible to a headset through a universal serial bus (USB) or Bluetooth connection, may be used. However, such a separate special purpose speaker has a limitation in usage and portability, and is unsuitable for a vehicle.

SUMMARY OF THE INVENTION

The present invention provides an apparatus and method for a short-range communication enabled headset that transmits an audio signal of the headset to an external audio system using frequency modulation (FM).

The present invention also provides an apparatus and method for a headset that forwards an audio signal received from a mobile terminal to an external audio system using frequency modulation.

The present invention further provides an apparatus and method for a headset that sets a frequency band for audio signal transmission using frequency modulation.

The present invention further provides an apparatus and method for a headset that can switch between a normal headset mode for audio signal output though an internal speaker and an FM transmission mode for audio signal transmission to an in-vehicle speaker unit.

The present invention further provides an apparatus and method for a short-range communication-enabled headset that can automatically adjust the input gain and output gain for audio signals during an FM transmission mode.

In accordance with an exemplary embodiment of the present invention, there is provided an audio signal output method for a headset, including checking, when an audio signal is present, an operating mode of the headset, outputting, if the headset is in a normal headset mode, the audio signal through an internal speaker and transmitting, if the headset is in a frequency modulation (FM) transmission mode, the audio signal through an FM channel to an external speaker unit for reproduction.

In accordance with another exemplary embodiment of the present invention, there is provided an audio signal output method for a headset, including checking whether a frequency modulation (FM) function is activated, outputting, if the FM function is not activated, an audio signal of the headset through an internal speaker and changing, if the FM function is activated, an audio output path to an FM transmitter, and transmitting the audio signal through the FM transmitter using an FM channel.

In accordance with another exemplary embodiment of the present invention, there is provided an audio signal output method for a headset, including receiving an audio signal from a mobile terminal through Bluetooth communication, detecting a mode change event during audio signal reception, changing an audio output path according to mode switching due to mode change event detection and sending the received audio signal through the audio output path.

In accordance with another exemplary embodiment of the present invention, there is provided an audio signal output method for a headset, including switching, in response to detection of a first event during a normal headset mode, an operating mode from the normal headset mode to a frequency modulation (FM) transmission mode, switching, in response to detection of a second event during the FM transmission mode, the operating mode from the FM transmission mode to the normal headset mode, outputting an audio signal through an internal speaker in the normal headset mode and transmitting an audio signal to an external audio system through an FM channel in the FM transmission mode.

In accordance with another exemplary embodiment of the present invention, there is provided an audio signal output apparatus for a headset, including a memory unit for storing an application program for changing an audio output path according to an operating mode of the headset, setting information associated with the application program, and a mapping table for mapping between vibration levels and gain values, an input unit for inputting a key signal for controlling the headset, and a mode change event, a frequency modulation (FM) transmitter for transmitting an audio signal of the headset through an FM channel to an external audio system, an audio processor for processing an audio signal of the headset, and sending the processed audio signal to an internal speaker or to the FM transmitter depending upon the operating mode and a control unit for controlling switching of the operating mode and changing of the audio output path according to the operating mode.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

The present invention relates to an apparatus and method that sends an audio signal from a Bluetooth enabled headset to an external speaker unit. The audio signal may include an acoustic signal of a music file played by the Bluetooth enabled headset, or a voice signal or acoustic signal received by the Bluetooth enabled headset through Bluetooth communication from a mobile terminal. The external speaker unit may be a speaker unit of an in-vehicle audio system (referred to as an in-vehicle speaker unit).

A headset and a mobile terminal communicate with each other through a wireless channel based upon Bluetooth technology. Although the present invention is describe with regard to Bluetooth technology, it would be recognized that the short-range wireless channel can also be established using short-range wireless communication based on infrared or ZigBee technology.

A normal headset mode and a frequency modulation (FM) transmission mode are defined for the Bluetooth enabled headset. In the normal headset mode, an audio signal is reproduced through an internal speaker of the Bluetooth enabled headset. In the FM transmission mode, an audio signal is transmitted from the Bluetooth enabled headset to an external speaker unit for reproduction.

In the FM transmission mode, vibration of a vehicle is measured through a sensor for automatic gain adjustment. Input gain is related to the signal level of a voice signal received by a microphone of the Bluetooth enabled headset. Output gain is related to the signal level of an audio signal to be sent to the in-vehicle speaker unit. Mappings between magnitudes of vibration and input and output gain values can be stored as a mapping table. The sensor may be an acceleration sensor or terrestrial magnetism sensor.

In the description, it is assumed that the transmit frequency of the Bluetooth enabled headset is tuned to an operating frequency of the in-vehicle audio system. For FM transmission of an audio signal, the transmit frequency of the Bluetooth enabled headset and the operating frequency of the in-vehicle audio system can be set in various manners.

Figure 1:
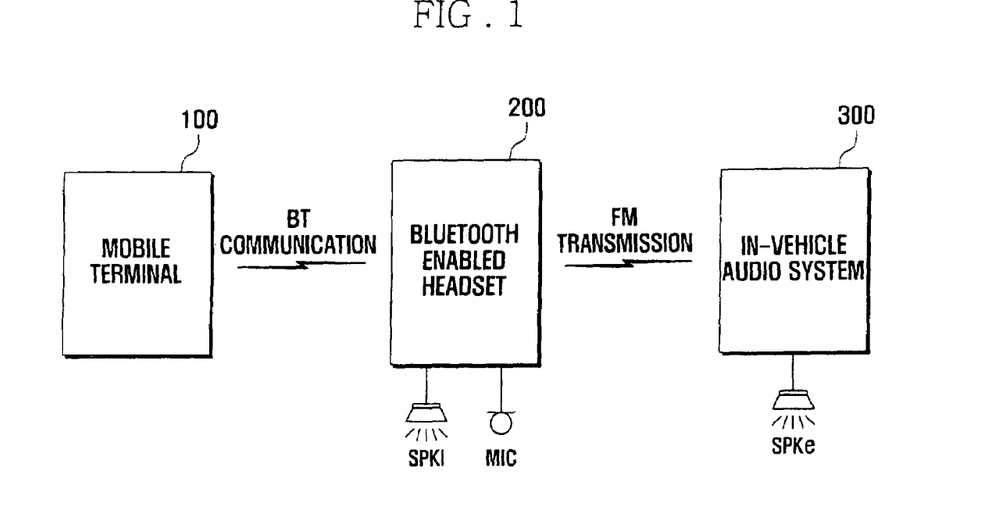
FIG. 1 illustrates a system related to the present invention.

FIG. 1 illustrates a system related to the present invention.

Referring to FIG. 1, the system includes a mobile terminal 100, Bluetooth enabled headset 200, and an external audio system, in this case an-vehicle audio system, 300. The mobile terminal 100 sends an audio signal to the Bluetooth enabled headset 200 through Bluetooth communication protocol. The Bluetooth enabled headset 200 reproduces an audio signal from the mobile terminal 100 through an internal speaker $SPK_i$, or sends the audio signal as an FM signal to the in-vehicle audio system 300. The in-vehicle audio system 300 reproduces the audio signal from the Bluetooth enabled headset 200 through an in-vehicle speaker unit $SPK_e$.

The mobile terminal 100 provides a voice service and various wireless data services through a mobile communication system to the user. In particular, the mobile terminal 100 is a portable terminal capable of short-range communication such as Bluetooth communication. The mobile terminal 100 sends an audio signal, that may be an acoustic signal generated by the mobile terminal 100 or a voice signal received by the mobile terminal 100 from another mobile terminal through wireless communication, to the Bluetooth enabled headset 200 through Bluetooth communication.

The Bluetooth enabled headset 200 receives an audio signal from the mobile terminal 100. The Bluetooth enabled headset 200 either reproduces the audio signal through the internal speaker $SPK_i$ or sends the audio signal as an FM signal to the in-vehicle audio system 300. For FM transmission, the Bluetooth enabled headset 200 preferably uses a frequency identical to an operating frequency within the range of the in-vehicle audio system 300.

The Bluetooth enabled headset 200 operates in the normal headset mode or FM transmission mode. In the normal headset mode, an audio signal is reproduced through the internal speaker $SPK_i$. In the FM transmission mode, an audio signal is transmitted through an FM channel to the in-vehicle audio system 300.

In the FM transmission mode, the Bluetooth enabled headset 200 measures the vibration level of the vehicle and performs automatic gain adjustment for input and output audio signals. In the normal headset mode and FM transmission mode, the Bluetooth enabled headset 200 receives a voice signal through a microphone MIC, and sends the received voice signal to the mobile terminal 100.

The in-vehicle audio system 300 includes an in-vehicle speaker unit $SPK_e$. The in-vehicle audio system 300 receives an audio signal from the Bluetooth enabled headset 200, and reproduces the received audio signal through the in-vehicle speaker unit $SPK_i$. If the in-vehicle audio system 300 includes a short-range communication module, it can send and receive data to and from the Bluetooth enabled headset 200 through, short-range communication channel.

As described above, a Bluetooth enabled headset can be used to send an audio signal from a mobile terminal as an FM signal to an in-vehicle speaker unit for reproduction. The Bluetooth enabled headset can act as a hands-free device. The Bluetooth enabled headset protects the privacy of the user in the normal headset mode, and enables nearby persons to enjoy the same audio sounds in the FM transmission mode. Accordingly, the Bluetooth enabled headset enhances convenience of the user, and can help the user to avoid a traffic accident, for example, while driving a car.

Various modifications can be made to the system of FIG. 1. For example, the wireless interface between the Bluetooth enabled headset 200 and in-vehicle audio system 300 can be replaced with a wired interface. The Bluetooth enabled headset 200 and in-vehicle audio system 300 can also be connected to each other through short-range communication for data exchange.

Figure 2:
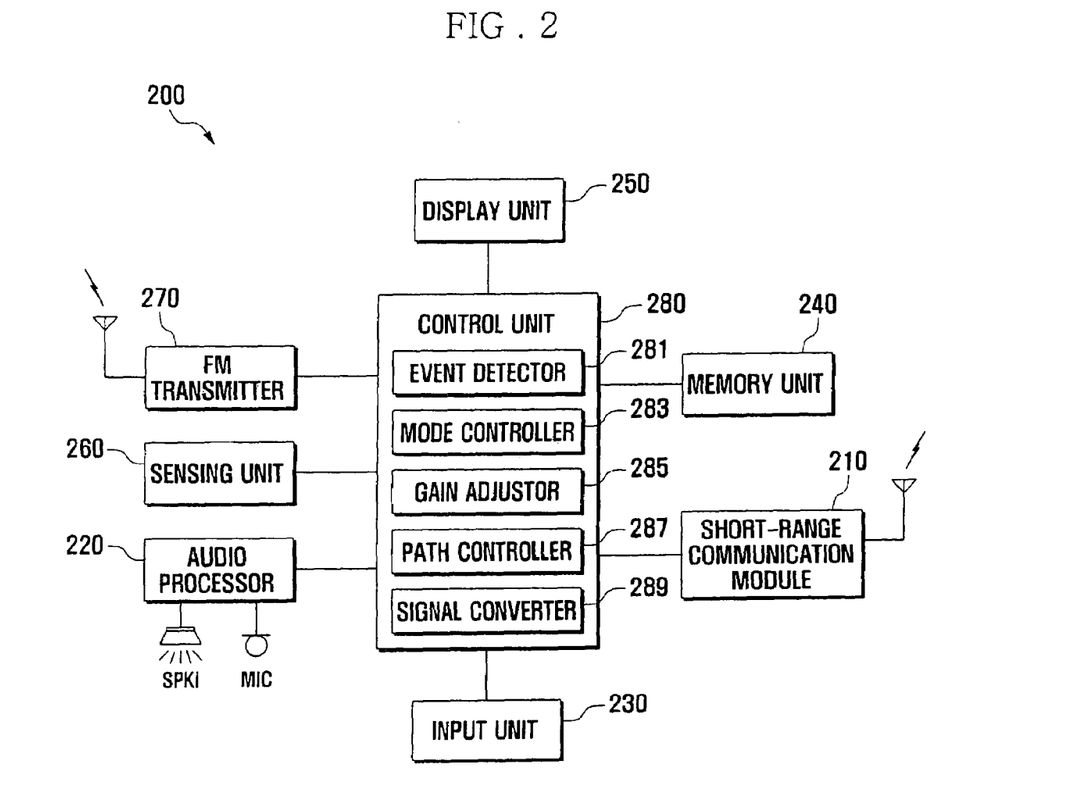
FIG. 2 illustrates a configuration of a headset according to an exemplary embodiment of the present invention.

FIG. 2 illustrates a configuration of the Bluetooth enabled headset 200 according to an exemplary embodiment of the present invention. The Bluetooth enabled headset 200 can function as a normal headset. For example, the Bluetooth enabled headset 200 receives a voice signal from a mobile terminal through Bluetooth communication and outputs the received voice signal through an internal speaker, or receives a voice signal through an internal microphone and sends the received voice signal to the mobile terminal through Bluetooth communication. In addition, the Bluetooth enabled headset 200 receives an acoustic signal of a music file played by the mobile terminal, and outputs the received acoustic signal through the internal speaker.

Referring to FIG. 2, the Bluetooth enabled headset 200 includes a short-range communication module 210, audio processor 220, input unit 230, memory unit 240, display unit 250, sensing unit 260, FM transmitter 270, and control unit 280. The control unit 280 includes an event detector 281, mode controller 283, gain adjustor 285, path controller 287, and signal converter 289.

The short-range communication module 210 performs operations related to short-range communication for the Bluetooth enabled headset 200. The short-range communication module 210 establishes a communication channel to a mobile terminal in a preset manner for transmission and reception of audio signals such as a voice signal and an acoustic signal. The short-range communication module 210 can be implemented using various short-range communication technologies such as Bluetooth, infrared, and ZigBee. For the purpose of description of the instant invention, the short-range communication module 210 is assumed to be a Bluetooth module.

The short-range communication module 210 communicates with another Bluetooth enabled device, such as a mobile terminal, through a Bluetooth antenna using Bluetooth protocols. The short-range communication module 210 stores a host stack for managing Bluetooth communication, and Bluetooth profiles and application programs selectable according to capabilities or conditions of external Bluetooth enabled devices. Thereto, the short-range communication module 210 may include a storage section.

The Bluetooth profiles may include the hands-free profile (HFP) for a hands-free device, the headset profile (HSP) for a headset, and the cordless telephony profile (CTP) for a wireless telephone. In particular, the short-range communication module 210 receives from the mobile terminal a voice signal in a format compatible with Bluetooth protocol, and sends the received voice signal to the audio processor 220. The short-range communication module 210 receives a voice signal input through a microphone MIC of the audio processor 220, and transmits the received voice signal in a format compatible with Bluetooth protocol to the mobile terminal.

The audio processor 220 outputs an audio signal, which is received by the short-range communication module 210 or generated in the Bluetooth enabled headset 200, through a speaker $SPK_i$. The audio processor 220 sends an audio signal to the FM transmitter 270 under the control of the control unit 280. The audio processor 220 receives an audio signal input through the microphone MIC, and transmits the received audio signal via the short-range communication module 210 to the mobile terminal.

The audio processor 220 converts a voice signal, which is sent by a mobile terminal and is received through the short-range communication module 210, into audible sounds for output under the control of the control unit 280. The audio processor 220 includes an amplifier for amplifying an input voice signal at a preset level, and a speaker for outputting the amplified voice signal. The speaker can be a bone conduction speaker for high sound clarity in a noisy environment.

The input unit 230 sends button signals for setting and controlling functions of the Bluetooth-enabled headset 200 to the control unit 280. The input unit 230 includes buttons for manipulating the Bluetooth-enabled headset 200. The buttons include a main button for call and power-on/off control, and a volume button for volume control. The input unit 230 may be composed of a touch panel, buttons, or a combination thereof.

The input unit 230 may include a sensing means for mode switching. The sensing means may include a Hall sensor for generating a control signal according to a state of the Bluetooth enabled headset 200. The sensing means detects occurrence of an event related to switching between the normal headset mode and FM transmission mode.

The memory unit 240 stores application programs for operations and functions related to the present invention (for example, FM transmission, FM frequency tuning, and audio output path setting). The memory unit 240 stores a table of mappings between vibration levels and input and output gain values and data from the mobile terminal, and the Bluetooth address (BD_ADDR) and personal identification number (PIN) code of the Bluetooth enabled headset 200. The memory unit 240 also stores setting information of FM transmission. The memory unit 240 may provide buffer areas for temporarily storing data generating from execution of an application program.

The display unit 250 displays various states of the Bluetooth enabled headset 200 under the control of the control unit 280. The display unit 250 may include a panel that is composed of display devices such as liquid crystal display (LCD) device or light emitting diodes (LED).

The sensing unit 260 senses movement of the Bluetooth enabled headset 200, and sends the sensed data to the control unit 280. The sensing unit 260 includes one or a combination of sensors, such as a terrestrial magnetism sensor and acceleration sensor, capable of measuring the amount of movement of an object. In particular, the sensing unit 260 measures the vibration level of the Bluetooth enabled headset 200 due to vibration of the vehicle.

The FM transmitter 270 transmits an audio signal of the Bluetooth enabled headset 200 through an FM channel to an in-vehicle audio system. The FM transmitter 270 transmits an audio signal using an initially set frequency band, and identifies an operating frequency of the in-vehicle audio system for audio signal transmission, when necessary.

The control unit 280 controls the overall operation of the Bluetooth enabled headset 200 and signal exchange between internal elements thereof. That is, the control unit 280 controls signal exchange between the short-range communication module 210, audio processor 220, input unit 230, memory unit 240, display unit 250, sensing unit 260, and FM transmitter 270. The control unit 280 may include a digital signal processor (DSP) for digital signal processing.

The control unit 280 turns on and off the Bluetoothenabled headset 200 according to a control signal from the input unit 230. The control unit 280 sends an audio signal received through the short-range communication module 210 to the audio processor 220.

In particular, the control unit 280 activates, deactivates, and controls an FM function. Upon activation of the FM function, the control unit 280 controls the change of a signal output path of an audio signal generated by the Bluetooth enabled headset 200, to output the audio signal from an internal speaker to transmit the audio signal to the in-vehicle audio system. While the FM function is activated, the control unit 280 adjusts the input gain and output gain according to the vibration level measured by the sensing unit 260. The control unit 280 controls switching between the normal headset mode and FM transmission mode.

The control unit 280 controls setting of a frequency band for sending an audio signal through an FM channel. That is, the control unit 280 controls tuning of the transmit frequency to an operating frequency of the in-vehicle audio system, and also controls conversion of an audio signal into an FM signal for transmission.

Thereto, the control unit 280 includes an event detector 281, mode controller 283, gain adjustor 285, path controller 287, and signal converter 289.

The event detector 281 detects occurrence of a mode change event for the Bluetooth-enabled headset 200, which operates in the normal headset mode or in the FM transmission mode. The event detector 281 detects an event generated by the Hall sensor of the input unit 230.

The mode controller 283 controls mode switching of the Bluetoothenabled headset 200 between the normal headset mode and FM transmission mode according to event detection of the event detector 281.

The gain adjustor 285 adjusts input gain and output gain for audio signals processed in the Bluetooth-enabled headset 200. The audio signals may include an acoustic signal of a music file played by the Bluetooth-enabled d headset 200, a voice signal and acoustic signal received from the mobile terminal through Bluetooth communication, and a voice signal input through the microphone MIC of the Bluetooth-enabled headset 200. The gain adjustor 285 extracts input and output gain values corresponding to a vibration level measured by the sensing unit 260 to adaptively adjust the input gain and output gain. The input gain is related to the signal level of a voice signal received by the microphone MIC of the Bluetooth-enabled headset 200. The output gain is related to the signal level of an audio signal to be sent to the in-vehicle speaker unit.

The path controller 287 controls setting of an audio output path in the Bluetooth-enabled headset 200 according to an event detected by the event detector 281. In the normal headset mode, the path controller 287 sets the audio output path to the internal speaker SPK. In the FM transmission mode, the path controller 287 sets the audio output path to the FM transmitter 270.

The FM transmitter 270 converts an audio signal of the Bluetooth-enabled headset 200 into a transmit signal using frequency modulation, and sends the transmit signal through an FM channel to the in-vehicle audio system.

In addition to the elements described in FIG. 2, the Bluetooth-enabled headset 200 may include a common module for performing common functions as a normal headset, and a wired interface for wired connections to at least one of the mobile terminal and the in-vehicle audio system.

Figure 3:
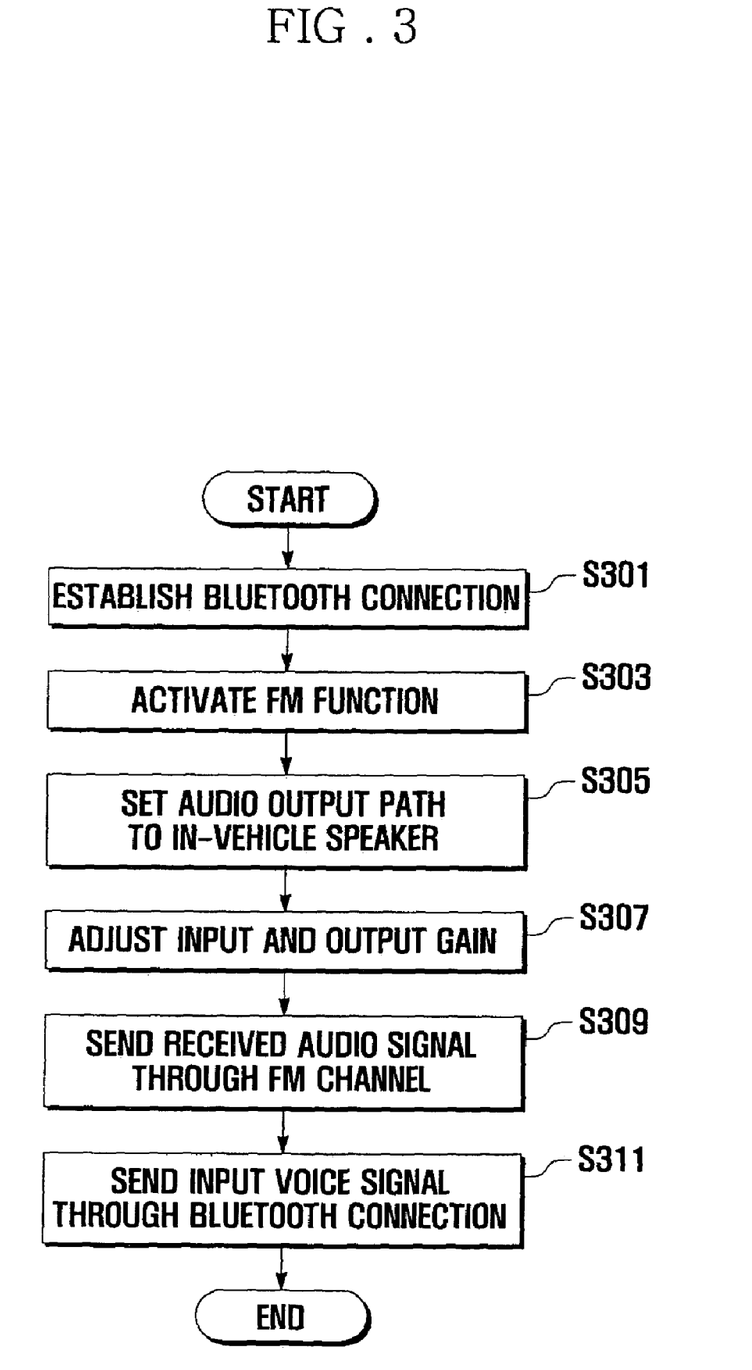
FIG. 3 is a flow chart illustrating an audio signal output method using an in-vehicle speaker unit according to another exemplary embodiment of the present invention.

FIG. 3 is a flow chart illustrating an audio signal output method using an in-vehicle speaker unit according to another exemplary embodiment of the present invention.

Referring to FIG. 3, the Bluetooth-enabled headset establishes a Bluetooth connection to the mobile terminal (S301), and then activates an FM function (S303). The FM function can be activated in response to an input of a user request or to detection of an event of mode switching from the normal headset mode to the FM transmission mode.

The Bluetooth enabled headset changes the audio output path from the internal speaker to the FM transmitter (S305).

The Bluetooth enabled headset adjusts the input gain and output gain (S307). That is, the Bluetooth enabled headset can adjust the gain of the microphone, and the output gain related to the signal level of an audio signal to be sent to the in-vehicle speaker unit in the FM transmission mode, for clear audio signal transmission and reception. Gain adjustment (step S307) is further described later in connection with FIG. 4.

Alternatively, step S307 (gain adjustment) may be performed before step S305 (audio output path setting), or step S305 and step S307 may be simultaneously performed. Performance of step S307 may be skipped if unnecessary.

Thereafter, the Bluetooth-enabled headset receives an audio signal from the mobile terminal through Bluetooth communication, and sends the received audio signal through the FM transmitter to the in-vehicle audio system (S309). The in-vehicle audio system then outputs the audio signal through the in-vehicle speaker unit.

The Bluetooth-enabled headset sends a voice signal input through the microphone to the mobile terminal using Bluetooth communication (S311). As the Bluetooth-enabled headset acts as a hands-free device, the microphone may receive voice signals of a plurality of persons.

In FIG. 3, the audio signal may be a voice signal or an acoustic signal that is generated by the mobile terminal and sent to the Bluetooth-enabled headset. The Bluetooth-enabled headset may also generate an audio signal (an acoustic signal), and output the generated audio signal through the internal speaker or send the generated audio signal through an FM channel to the in-vehicle audio system.

Figure 4:
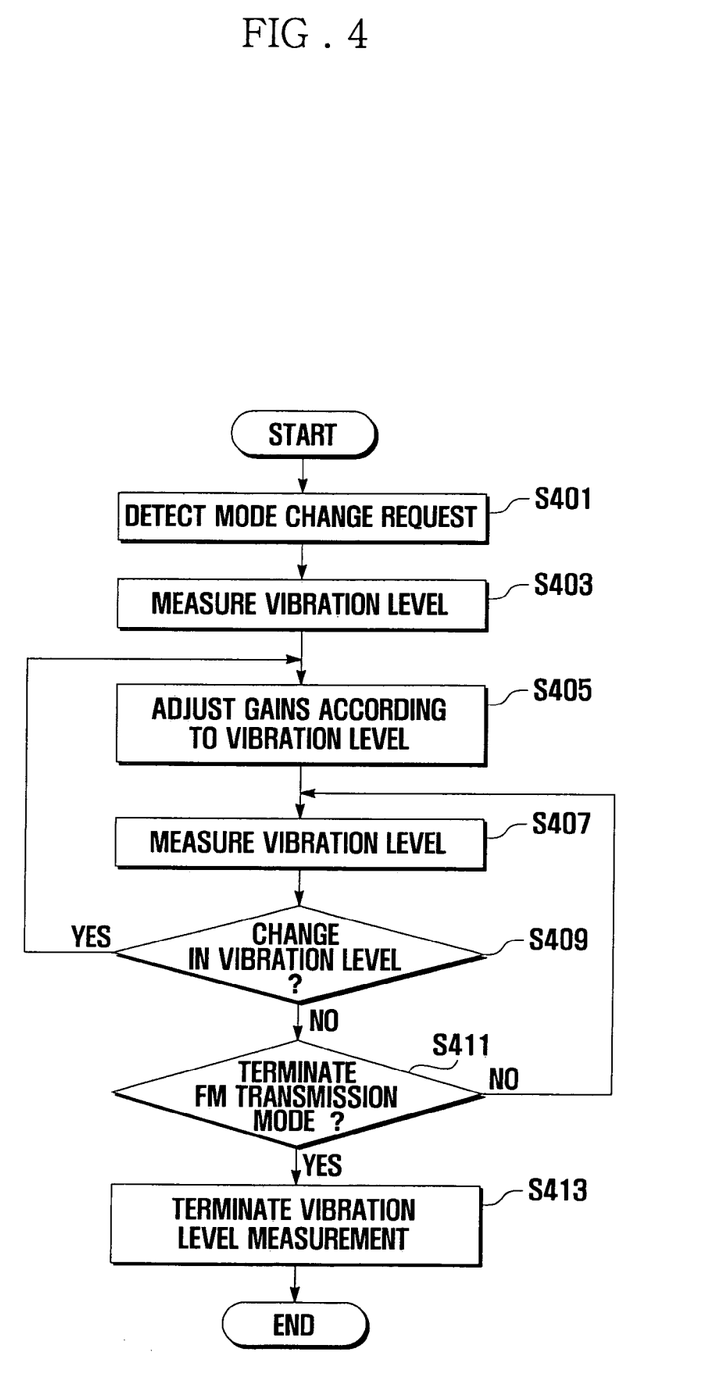
FIG. 4 is a flow chart illustrating a procedure of input and output gain adjustment in the method of FIG. 3.

FIG. 4 is a flow chart illustrating a procedure of input and output gain adjustment in the method of FIG. 3.

Referring to FIG. 4, when the control unit of the Bluetooth enabled headset detects occurrence of a mode change event of switching from the normal headset mode to the FM transmission mode (S401), the control unit controls the sensing unit to measure the vibration level (S403).

The control unit adjusts the input and output gains according to the measured vibration level (S405). For gain adjustment, the control unit can refer to a mapping table stored in the memory unit to find mappings between vibration levels and input and output gain values.

The control unit measures the vibration level (S407), and determines whether a change in the vibration level is present (S409). Steps S407 and S409 are repeated at regular intervals during the FM transmission mode. A change in the vibration level can be detected by comparing two successively measured vibration levels with each other with a preset error tolerance.

If a change in the vibration level is present, the control unit returns to step S405 for readjusting the input and output gains according to the change in the vibration level. That is, the control unit performs gain adjustment for high sound clarity.

If a change in the vibration level is not present, the control unit determines whether a termination request for the FM transmission mode is made (S411). The termination request for the FM transmission mode may correspond to a user command or an event of mode switching from the FM transmission mode to the normal headset mode.

If a termination request for the FM transmission mode is made, the control unit controls the sensing unit to terminate measurement of the vibration level (S413). If a termination request for the FM transmission mode is not made, the control unit continues vibration level measurement and gain adjustment.

Figure 5:
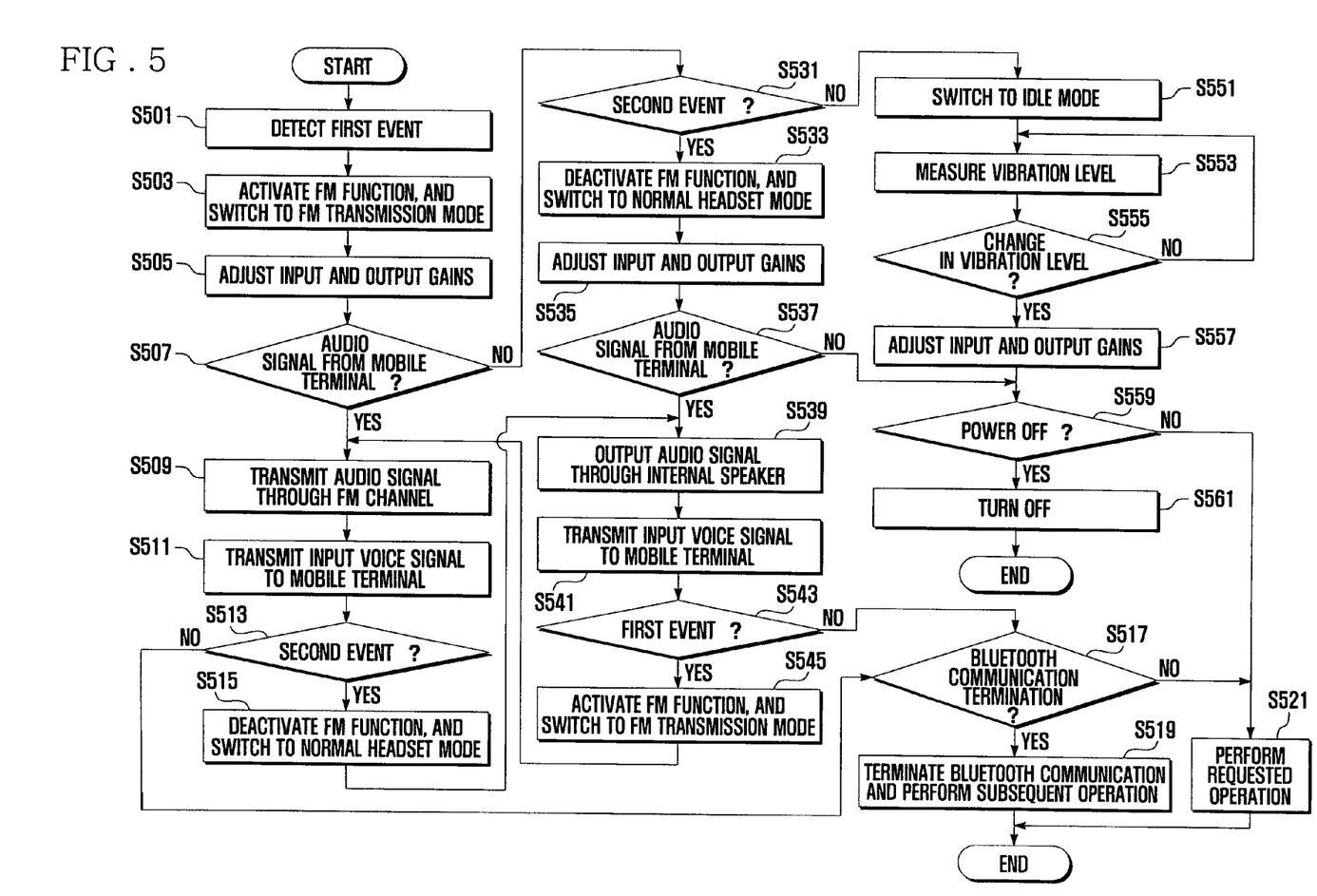
FIG. 5 is a flow chart illustrating a procedure of audio signal output in the method of FIG. 3.

FIG. 5 is a flow chart illustrating a procedure of audio signal output in the method of FIG. 3.

When a first event is detected (S501), the control unit of the Bluetooth-enabled headset activates the FM function and switches the operating mode to the FM transmission mode (S503). The first event is an event of mode switching from the normal headset mode to the FM transmission mode.

The control unit adjusts input and output gains (S505). Input and output gain adjustment is described in connection with FIGS. 3 and 4.

In the FM transmission mode, the control unit determines whether an audio signal from a mobile terminal is received through Bluetooth communication (S507). The control unit controls reception of an audio signal from the mobile terminal through Bluetooth communication, and also controls transmission of a voice signal input by a microphone of the Bluetooth enabled headset to the mobile terminal through Bluetooth communication.

If an audio signal from the mobile terminal is received, the control unit transmits the received audio signal through an FM channel to an in-vehicle audio system (S509). The control unit also transmits a voice signal input by the microphone to the mobile terminal through Bluetooth communication (S511).

During signal reception and transmission, the control unit determines whether a second event is detected (S513). The second event is an event of mode switching from the FM transmission mode to the normal headset mode. If a second event is detected, the control unit deactivates the FM function and switches the operating mode to the normal headset mode (S515). According to mode change to the normal headset mode, the control unit changes the audio output path to an internal speaker of the Bluetooth enabled headset, and outputs the audio signal from the mobile terminal through the internal speaker (S539).

During signal reception and transmission, the control unit determines whether a Bluetooth termination request is issued (S517). If a Bluetooth termination request is issued, the control unit terminates Bluetooth communication with the mobile terminal and performs a subsequent operation (for example, entering into an idle mode or performing a requested operation) (S519). If a Bluetooth termination request is not issued, the control unit may continue operations necessary for the current operating mode (S521).

When a second event is detected after performance of steps S501 to S505 (S531), the control unit deactivates the FM function, switches the operating mode to the normal headset mode (S533), and adjusts input and output gains on the basis of, preferably, default gain values for the normal headset mode (S535).

In the normal headset mode, the control unit determines whether an audio signal from the mobile terminal is received through Bluetooth communication (S537). If an audio signal from the mobile terminal is received, the control unit outputs the audio signal through the internal speaker (S539). The control unit transmits a voice signal input by the microphone to the mobile terminal through Bluetooth communication (S541).

During signal reception and transmission, the control unit determines whether a first event is detected (S543). If a first event is detected, the control unit activates the FM function and switches the operating mode to the FM transmission mode (S545). According to mode change to the FM transmission mode, the control unit changes the audio output path and transmits the received audio signal through an FM channel to the in-vehicle audio system (S509).

During signal reception and transmission, the control unit may determine whether a Bluetooth termination request is issued (S517).

When an event is not detected after performance of steps S501 to S505, the control unit may switch the operating mode to an idle mode (S551). In the idle mode, the control unit measures the vibration level of the Bluetooth-enabled headset at regular intervals (S553). Measurement of the vibration level is described in connection with FIGS. 3 and 4. Measurement of the vibration level may also be performed in the normal headset mode or FM transmission mode, for high sound clarity.

The control unit checks whether a change in the vibration level is present (S555). When a change in the vibration level is present, the control unit adjusts the input and output gains (S557).

The control unit checks whether a power-off request is issued (S559). If a power-off request is issued, the control unit turns off the Bluetooth enabled headset (S561). Otherwise, the control unit performs a requested operation (S521).

In FIG. 5, the audio signal is a signal received from the mobile terminal. The audio signal may also be a signal generated by the Bluetooth enabled headset (for example, an acoustic signal generated by audio file playing). In the case of audio signal generation in the Bluetooth-enabled headset, audio signal reception and transmission through Bluetooth communication may be skipped.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As apparent from the above description, the present invention provides an audio signal output method and apparatus for a Bluetooth enabled headset that can output an audio signal through an internal speaker or transmit the audio signal through an FM channel to an external speaker, e.g. an in-vehicle speaker unit. The Bluetooth enabled headset can switch between a normal headset mode for outputting an audio signal through the internal speaker and an FM transmission mode for sending an audio signal to the in-vehicle speaker unit for reproduction. The Bluetooth-enabled headset can act as a hands-free device. In addition, the Bluetooth-enabled headset protects the privacy of the user in the normal headset mode, and enables nearby persons to enjoy the same audio sounds in the FM transmission mode. Accordingly, the Bluetooth enabled headset enhances convenience of the user, and can help the user to avoid a traffic accident while driving a car.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. An audio signal output method for operation of a headset, comprising:
   determining by said headset an operating mode of the headset;
   outputting, if the headset is in a normal headset mode, the audio signal through an internal speaker of the headset; and
   transmitting from said headset, if the headset is in a frequency modulation (FM) transmission mode, the audio signal through an FM channel portion of said headset to a speaker unit which is external of said headset for reproduction.

2. The audio signal output method of claim 1, further comprising:
   detecting by said headset a mode change event of the headset;
   switching, upon detection of a mode change event, the operating mode to the other mode; and
   changing an audio output path according to the mode switched to.

3. The audio signal output method of claim 2, further comprising:
   performing, upon switching to the FM transmission mode, input and output gain adjustment for audio signals.

4. The audio signal output method of claim 1, further comprising:
   measuring at said headset, if the FM transmission mode is activated, a movement level of the headset;
   extracting gain values corresponding to the measured movement level; and
   adjusting input and output gain values for audio signals using the extracted gain values.

5. An audio signal output method for operation of a headset, comprising:
   checking by said headset whether a frequency modulation (FM) function is activated;
   outputting, if the FM function is not activated, an audio signal of the headset through an internal speaker of said headset; and
   changing, if the FM function is activated, an audio output path to an FM transmitter portion of said headset, and transmitting the audio signal through the FM transmitter using an FM channel.

6. The audio signal output method of claim 5, further comprising:
   measuring by said headset, if the FM function is activated, a movement level of the headset;
   extracting gain values corresponding to the measured movement level; and
   adjusting input and output gain values for audio signals using the extracted gain values.

7. The audio signal output method of claim 6, further comprising:
   checking whether a change in the movement level is present, and readjusting the input and output gains if a change in the movement level is present.

8. An audio signal output method for operation of a short-range communication headset, comprising:
   receiving by said headset an audio signal from a mobile terminal through a short-range communication protocol;
   detecting by said headset a mode change event during audio signal reception;
   changing an audio output path of said headset according to the detected mode change event, the changing step comprises setting, upon mode switching to a normal headset mode, the audio output path to an internal speaker; and setting, upon mode switching to a frequency modulation (FM) transmission mode, the audio output path to an FM transmitter; and
   sending the received audio signal through an FM channel portion of said head set to a speaker which is external of said headset for reproduction.

9. The audio signal output method of claim 8, wherein the sending the received audio signal to an FM transmitter comprises:
   transmitting the received audio signal through the FM transmitter using an FM channel to an external audio system.

10. The audio signal output method of claim 8, further comprising:
    measuring, after mode switching to the FM transmission mode, a movement level of the short-range communication headset at regular intervals; and
    adjusting a gain of a microphone of the headset according to the measured movement level.

11. The audio signal output method of claim 10, further comprising:
    transmitting a voice signal from the microphone to the mobile terminal through the short-range communication protocol.

12. An audio signal output method for a short-range communication headset, comprising:
    switching, in response to detection of a first event during a normal headset mode, an operating mode of said headset from the normal headset mode to a frequency modulation (FM) transmission mode;
    switching, in response to detection of a second event during the FM transmission mode, the operating mode of said headset from the FM transmission mode to the normal headset mode;
    outputting an audio signal through an internal speaker of said headset in the normal headset mode; and
    transmitting an audio signal to an audio system that is external from said headset through an FM channel in the FM transmission mode.

13. The audio signal output method of claim 12, wherein the switching the operating mode from the FM transmission mode to the normal headset mode further comprises setting an audio output path to the internal speaker.

14. The audio signal output method of claim 12, wherein the switching the operating mode from the normal headset mode to the FM transmission mode further comprises setting the audio output path to an FM transmitter.

15. The audio signal output method of claim 12, wherein the first event causes mode-switching from the normal headset mode to the FM transmission mode.

16. The audio signal output method of claim 12, wherein the second event causes mode-switching from the FM transmission mode to the normal headset mode.

17. The audio signal output method of claim 12, further comprising adjusting, upon mode switching, input and output gains for audio signals.

18. The audio signal output method of claim 17, wherein the adjusting input and output gains comprises:
    adjusting the input and output gains in the normal headset mode to default gain values; and
    adjusting the input and output gains in the FM transmission mode according to a movement level of the headset.

19. The audio signal output method of claim 18, wherein the adjusting the input and output gains in the FM transmission mode further comprises:
determining whether a change in the movement level is present, and readjusting the input and output gains if a change in the movement level is present.

20. An audio signal output apparatus for a short-range communication headset, comprising:
a memory unit for storing an application program for changing an audio output path according to an operating mode of the headset, setting information associated with at least one application program, and a mapping table for mapping between movement levels and gain values;
an input unit for inputting a key signal for controlling the headset, and a mode change event;
a frequency modulation (FM) transmitter for transmitting an audio signal through an FM channel to an external audio system;
an audio processor for processing an audio signal, and sending the processed audio signal to an internal speaker or to the FM transmitter depending upon the operating mode of the headset; and
a control unit for controlling the switching of the operating mode and changing of the audio output path according to the headset operating mode.

21. The audio signal output apparatus of claim 20, wherein the control unit controls mode-switching between a normal headset mode and FM transmission mode, and sets the audio output path to the FM transmitter in the FM transmission mode to control FM transmission of the audio signal.

22. The audio signal output apparatus of claim 21, wherein the control unit adjusts input and output gains of the headset according to the operating mode.

23. The audio signal output apparatus of claim 22, wherein the control unit measures a movement level of the headset at regular intervals during the FM transmission mode and adjusts the input and output gains according to the measured movement level.

24. The audio signal output apparatus of claim 21, wherein the control unit controls setting of a transmit frequency for FM transmission of the audio signal, and converts the audio signal into an FM signal for transmission.

25. The audio signal output apparatus of claim 21, wherein the control unit comprises:
an event detector for detecting a mode change event;
a mode controller for switching the operating mode of the headset according to the detected mode change event;
a gain adjustor for adjusting the input and output gains for audio signals; and
a path controller for controlling the audio output path according to the detected mode change event.

26. The audio signal output apparatus of claim 25, wherein the event detector detects an event generated by a Hall sensor of the input unit.

27. The audio signal output apparatus of claim 25, wherein the gain adjustor extracts gain values corresponding to a measured vibration level from the mapping table, and adjusts the input and output gains using the extracted gain values.

28. The audio signal output apparatus of claim 25, wherein the path controller sets the audio output path to the internal speaker in the normal headset mode, and sets the audio output path to the FM transmitter in the FM transmission mode.

29. The audio signal output apparatus of claim 25, wherein the control unit further comprises a signal converter for converting an audio signal into an FM signal for transmission.

30. The audio signal output apparatus of claim 20, wherein the FM transmitter transmits an audio signal using a preset frequency band.

31. The audio signal output apparatus of claim 20, wherein the FM transmitter finds an operating frequency of the external audio system, and transmits an audio signal using the found operating frequency.

32. The audio signal output apparatus of claim 20, further comprising a short-range communication module for transmitting and receiving an audio signal through short-range communication to and from a mobile terminal.

33. The audio signal output apparatus of claim 20, further comprising a sensing unit for measuring a movement level of the headset.

34. The audio signal output apparatus of claim 33, wherein the sensing unit comprises one or a combination of a terrestrial magnetism sensor and an acceleration sensor.

35. The audio signal output apparatus of claim 20, wherein the input unit comprises a Hall sensor.

36. The audio signal output apparatus of claim 20, wherein the short-range communication is selected from the group consisting of: Bluetooth, infrared and ZigBee.

* * * * *